United States Patent

Cookson

[11] 4,372,043
[45] Feb. 8, 1983

[54] METHOD OF ASSEMBLING A GAS-INSULATED POWER TRANSMISSION LINE WITH DUTER ENCLOSURE OF CARBON STEEL AND ALUMINUM

[75] Inventor: Alan H. Cookson, Churchill Borough, Pa.

[73] Assignee: Westinghouse Electric Corp., Pittsburgh, Pa.

[21] Appl. No.: 206,919

[22] Filed: Nov. 14, 1980

[51] Int. Cl.³ .................. H02G 1/00; H01B 9/06; H02G 5/06
[52] U.S. Cl. ............................ 29/828; 156/48; 174/14 R; 174/28; 174/106 R; 174/126 CP
[58] Field of Search .............. 174/14 R, 16 B, 27, 174/28, 29, 36, 68 C, 99 R, 99 B, 102 D, 105 R, 106 R, 106 D, 126 CP; 29/825, 828, 868, 433; 138/114, 143; 156/47, 48; 307/147

[56] References Cited

U.S. PATENT DOCUMENTS

| 2,589,700 | 3/1952 | Johnstone | 174/106 R |
|---|---|---|---|
| 2,785,218 | 3/1957 | Kirch | 174/106 R |
| 3,206,541 | 9/1965 | Jachimowicz | 174/106 R X |
| 3,376,378 | 4/1968 | Bullock | 174/106 R X |
| 3,586,754 | 6/1971 | Meskell, Jr. | 174/106 R |
| 3,590,141 | 6/1971 | Mildner | 174/36 X |
| 3,610,947 | 10/1971 | Stephanides | 307/147 |
| 3,634,606 | 1/1972 | Iyengar | 174/106 D |
| 3,711,621 | 1/1973 | Jachimowicz | 174/106 D X |
| 3,715,453 | 2/1973 | Aupoix et al. | 174/106 R X |
| 3,767,837 | 10/1973 | Graybill | 174/16 B X |
| 4,092,485 | 5/1978 | Wanser | 174/28 |
| 4,095,040 | 6/1978 | Cookson | 174/28 |

OTHER PUBLICATIONS

International Application (PCT), WO 79/00607, published Aug. 23, 1979, Knudsen et al.

Primary Examiner—Laramie E. Askin
Attorney, Agent, or Firm—M. S. Yatsko

[57] ABSTRACT

A gas-insulated power transmission line includes an outer enclosure containing an inner conductor and insulating supports for insulatably supporting the inner conductor within the outer enclosure. An electrically insulating gas electrically insulates the inner conductor from the outer enclosure. The outer enclosure is comprised of two separate components; an outer sheath made of carbon steel, a grounded inner sheath disposed within the outer sheath and made of aluminum. The inner sheath, containing the inner conductor and the insulating supports, is assembled separately from the outer sheath and then the inner sheath assemblage is inserted within the outer sheath at the final field location.

1 Claim, 1 Drawing Figure

U.S. Patent  Feb. 8, 1983  4,372,043
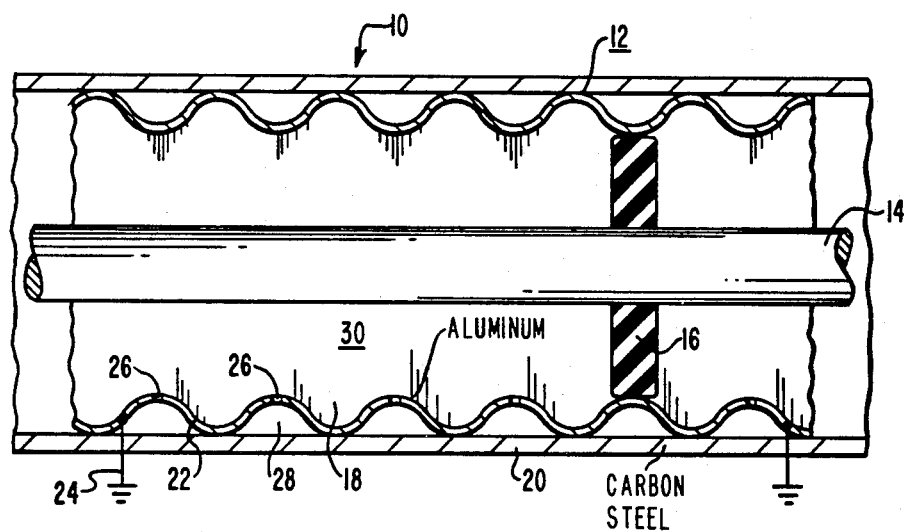

METHOD OF ASSEMBLING A GAS-INSULATED POWER TRANSMISSION LINE WITH DUTER ENCLOSURE OF CARBON STEEL AND ALUMINUM

BACKGROUND OF THE INVENTION

This invention relates generally to gas-insulated power transmission lines, and more particularly to a power transmission line which utilizes two sheaths, one of carbon steel and the other of aluminum for the outer enclosure.

Compressed gas-insulated power transmission lines are a relatively recent commercial product which is gaining increased acceptance by the electric utility industry as an economical means for transmitting large blocks of electrical energy, and for use in special applications where conventional power transmission lines are inadequate. A typical compressed gas-insulated transmission line is generally comprised of an elongated outer sheath having disposed therein an inner conductor at high potential, with means disposed in the outer sheath to insulatably support the inner conductor within the outer sheath. An insulating gas, typical of which is sulfur hexafluoride at a pressure of 50 psi gauge, is utilized for electrically insulating the inner conductor from the outer sheath. The inner conductor is typically used to transmit energy at voltage ranges from 121–1200 KV. Both the inner conductor and the outer sheath are of good electrically conducting materials such as aluminum.

One of the drawbacks of gas-insulated power transmission lines which is hindering even more widespread applications of the lines is associated with the cost of the lines. One of the more costly components of the transmission lines is the outer enclosure utilized to contain the inner conductor and the insulating gas.

Present gas-insulated power transmission lines utilize a solid enclosure of aluminum to contain the inner conductor and the insulating gas. Aluminum is preferred because of the low loss it exhibits to the return current flowing through it induced by the conductor currents on the inner conductor. Typically, for grounded aluminum enclosures, the loss ratio (i.e., the ratio of enclosure loss to conductor loss) is of the order of one or less. However, the aluminum material utilized for the enclosure is itself expensive, and large quantities of the material must be utilized.

One method attempted in the prior art to minimize the cost of the outer enclosure has been to utilize carbon steel as the outer enclosure. Although carbon steel pipe is generally readily available at less expensive costs, the losses which result with respect to the return current are substantial. The loss ratio of carbon steel is generally of the order of three or higher. Therefore, because of the high-loss ratio, the use of carbon steel for the outer enclosure has generally occurred only when the current rating of a line is very low and the high electrical losses are acceptable.

SUMMARY OF THE INVENTION

The above-mentioned disadvantage of the prior art is overcome by this invention which provides a high-voltage, gas-insulated power transmission line including a gas-tight carbon steel outer sheath with a grounded aluminum cylindrical inner sheath disposed within, but separate from, the outer sheath. An inner conductor at high potential is disposed within the inner sheath, and means are included for insulatably supporting the inner conductor within the outer sheath. An electrically insulating gas is disposed within both outer and inner sheaths and electrically insulates the inner conductor from the inner and outer sheaths. The inner sheath, of aluminum, has a wall thickness which is sufficient to conduct the return currents induced by the electric current on the inner conductor, and further the inner sheath is capable of being inserted in the outer sheath.

A method of assembling a high-voltage power transmission line is further disclosed which includes the steps of forming a gas-tight cylindrical outer sheath of carbon steel, inserting a cylindrical aluminum inner sheath in the outer sheath, grounding the inner sheath, inserting a conductor in the inner sheath, and inserting an electrically insulating gas in the inner and outer sheaths. An alternative method of assembling is to form a gas-tight cylindrical outer sheath of carbon steel, place the outer sheath in its final location, insert an insulatably supported inner conductor in a cylindrical aluminum inner sheath in a manufacturing facility to form an inner sheath-inner conductor assemblage, transport the inner sheath-inner conductor assemblage to the location of the outer sheath, insert such assemblage into the outer sheath, ground the inner sheath, and insert an electrically insulating gas in the outer sheath.

BRIEF DESCRIPTION OF THE DRAWINGS

Reference is now made to the description of the preferred embodiment, illustrated in the accompanying drawing, in which the sole FIGURE illustrates, partly in section and partly in elevation, a gas-insulated power transmission line according to the teachings of this invention.

DESCRIPTION OF THE PREFERRED EMBODIMENTS

Referring now more particularly to the sole FIGURE, therein is illustrated a compressed gas-insulated power transmission line 10 according to the teachings of this invention. The power transmission line 10 is comprised of an outer enclosure 12 having disposed therein an inner conductor 14 which would be at high potential such as 121–1200 KV and which conducts an electric current. Insulatably supporting the inner conductor 14 within the outer enclosure 12 is an insulating support 16, a number of which would typically be utilized at spaced intervals along the length of the transmission line 10. Disposed within the outer enclosure 12 is an electrically insulating gas 18, typical of which is sulfur hexafluoride at a pressure of 50 psi gauge.

The outer enclosure 12 is comprised of a gas-tight cylindrical carbon steel outer sheath 20 and a grounded cylindrical inner sheath 22 of aluminum, preferably insulated from the outer sheath 20. The inner sheath 22 is not necessarily gas-tight, for the inner sheath does not function as a pressure container for the insulating gas 18. Rather, the outer sheath 20 functions as a gas-tight, pressure enclosure enclosing the insulating gas 18, and the purpose of the inner sheath 22 is to provide for the return currents which may be induced therein by the magnetic fields generated by the electric currents flowing through the inner conductor 14. Further, the inner sheath 22 functions to prevent the magnetic field induced in the transmission line 10 from extending to the outer sheath 20, with the result being that there is negligible magnetic field in the carbon steel outer sheath 20 to induce losses therein. Thus, since all the return current is conducted through the aluminum inner sheath 22 instead of the carbon steel outer sheath 20, and because aluminum has a substantially smaller enclosure/conductor loss ratio than carbon steel, the resultant losses in the transmission line 10 due to the induced return current are minimized.

As previously described, it is desirable that no return current exists in the carbon steel outer sheath 20 so as to minimize the resulting losses. To accomplish this, the aluminum inner sheath 22 is grounded as at 24 and similar grounds 24 would be disposed typically at intervals of several hundred feet. Failure to so ground the inner sheath will result in smaller induced current in the inner sheath 20 and losses induced in the carbon steel outer sheath 20 due to the magnetic field which is existing there.

Further, the inner sheath 22 has a wall thickness sufficient to conduct the return currents induced by the inner conductor 14 electric current, for if this inner sheath 22 is not thick enough to conduct the full return current induced, the magnetic field will extend outwardly to the outer sheath 20 and induce return currents therein, resulting in increased losses. For example, for a 1200 KV design for grounded aluminum sheath, the wall thickness of the aluminum must be thicker than approximately 0.08 inch.

Because the inner sheath 22 is not utilized for containing the insulating gas 18, there is no necessity that the inner sheath 22 be gas-tight. Indeed, it may be advantageous to provide a plurality of apertures 26, in the form of holes or slots, in the inner sheath 22. These slots 26 would enable any contamination particles present within the insulating gas 18 between the inner conductor 14 and the inner sheath 22 to enter the very low field region 28 which exists between the inner sheath 22 and the outer sheath 20. Once the contamination particles enter this low field region 28, there would not be sufficient force exerted upon them to lift them back into the region 30 between the inner conductor 14 and the inner sheath 22 where they may initiate flashover or breakdown.

Although in the FIGURE the inner sheath 22 is illustrated as having a corrugated housing, if desired, the inner sheath 22 may be a smooth cylindrical member.

Because the outer sheath 20 and the inner sheath 22 are separate members with the inner sheath 22 capable of being inserted in the outer sheath 20, the assembly of the power transmission line 10 can be simplified. For example, one method of assembling the transmission line 10 may comprise forming the gas-tight cylindrical outer sheath 20 of carbon steel, inserting the aluminum inner sheath 22 in the outer sheath, grounding, as at 24, the inner sheath 22, inserting the inner conductor 14 in the inner sheath 22, and then inserting the insulating gas 18 in the enclosure 12. These steps can be undertaken in numerous orders. For example, the inner conductor 14 could be inserted within the inner sheath 22, initially, with the resulting assemblage then being inserted into the carbon steel outer sheath 20. Alternatively, the inner sheath 22 could be inserted into the carbon steel outer sheath 20 initially, with the inner conductor 14 then being inserted within the outer sheath 22. Furthermore, the inner conductor 14 can be inserted into the inner sheath 22 during assembly operations at the manufacturing facility, while the outer sheath 20 is assembled and placed in its final location in the field. The assembled inner sheath 22/inner conductor 14 assemblage could then be transported to the field where the assemblage would be inserted into the outer sheath 20.

Thus, it can be seen that this invention describes an improved high-voltage, gas-insulated power transmission line utilizing an outer enclosure of separate carbon steel and aluminum sheaths to minimize the expense of the transmission line while keeping losses to a minimum.

I claim as my invention:

1. A method of assembling a high-voltage, gas-insulated power transmission line comprising the steps of:

forming a gas-tight cylindrical outer sheath of carbon steel;

placing the outer sheath in its final installation location;

inserting an insulatably supported inner conductor in a cylindrical aluminum inner sheath in a manufacturing facility to form an inner sheath-inner conductor assemblage;

transporting the inner sheath-inner conductor assemblage to the location of said outer sheath; and sequentially inserting said inner sheath-inner conductor assemblage in said outer sheath after said outer sheath has been placed in its final installation location;

grounding said inner sheath; and inserting an electrically insulating gas in said outer sheath.

* * * * *